US 9,838,361 B2

(12) United States Patent
Birger

(10) Patent No.: US 9,838,361 B2
(45) Date of Patent: Dec. 5, 2017

(54) SECURE MIGRATION OF VIRTUAL MACHINES FROM SOURCE TO TARGET AND TRANSFER OF VM DESCRIPTOR AND KEYS BETWEEN PHYSICAL SERVERS

(71) Applicant: Ari Birger, Palo Alto, CA (US)

(72) Inventor: Ari Birger, Palo Alto, CA (US)

(73) Assignee: Ari Birger, Palo Alto, CA (US)

( * ) Notice: Subject to any disclaimer, the term of this patent is extended or adjusted under 35 U.S.C. 154(b) by 0 days.

(21) Appl. No.: 15/592,953

(22) Filed: May 11, 2017

(65) Prior Publication Data
US 2017/0250963 A1 Aug. 31, 2017

Related U.S. Application Data

(62) Division of application No. 14/789,916, filed on Jul. 1, 2015, now Pat. No. 9,667,606.

(51) Int. Cl.
| | | |
|---|---|---|
| *H04L 29/06* | (2006.01) | |
| *G06F 3/06* | (2006.01) | |
| *H04L 9/08* | (2006.01) | |
| *H04L 9/14* | (2006.01) | |
| *H04L 9/30* | (2006.01) | |

(Continued)

(52) U.S. Cl.
CPC ......... *H04L 63/0428* (2013.01); *G06F 3/067* (2013.01); *G06F 3/0647* (2013.01); *G06F 9/45558* (2013.01); *G06F 21/57* (2013.01); *H04L 9/0819* (2013.01); *H04L 9/14* (2013.01); *H04L 9/30* (2013.01); *H04L 63/06* (2013.01); *G06F 2009/4557* (2013.01); *G06F 2009/45562* (2013.01); *G06F 2009/45583* (2013.01)

(58) Field of Classification Search
None
See application file for complete search history.

(56) References Cited

U.S. PATENT DOCUMENTS

| | | |
|---|---|---|
| 7,796,760 B2 | 9/2010 | Brettle et al. |
| 8,448,233 B2 | 5/2013 | Shulman et al. |

(Continued)

OTHER PUBLICATIONS

Campagna, AWS Key Managment Service Cryptographic Details (2014).

(Continued)

*Primary Examiner* — Hadi Armouche
*Assistant Examiner* — Andrew Steinle
(74) *Attorney, Agent, or Firm* — Robert Mott

(57) ABSTRACT

Systems, methods, and non-transitory computer-readable medium are provided to secure data centers and cloud computing. A method receives network identifiers for functions, requests a network key for each function, allocates network interfaces, requests a virtual network interface controller allocation, requests a network key for each cloud function, receives storage identifiers for functions, requests a storage key for each cloud function, allocates virtual storage disks, requests a storage interface controller allocation, requests a storage key for each cloud function. Methods secure migration of a virtual machine from a source to a target server. A server includes multiple cores where each core is dedicated to a compute function and a unique key encrypts data of each compute function. A non-transitory computer-readable medium encodes programs that execute the above methods.

2 Claims, 14 Drawing Sheets

(51) Int. Cl.
　　*G06F 9/455*　　(2006.01)
　　*G06F 21/57*　　(2013.01)

(56) References Cited

U.S. PATENT DOCUMENTS

| | | | |
|---|---|---|---|
| 8,539,589 | B2 | 9/2013 | Prafullchandra et al. |
| 8,555,377 | B2 | 10/2013 | Pate et al. |
| 8,726,398 | B1 | 5/2014 | Tock et al. |
| 8,812,871 | B2 | 8/2014 | Monclus et al. |
| 8,832,784 | B2 | 9/2014 | Budko et al. |
| 8,909,928 | B2 | 12/2014 | Ahmad et al. |
| 8,930,714 | B2 | 1/2015 | Glew et al. |
| 8,966,581 | B1 | 2/2015 | Gross et al. |
| 9,038,151 | B1 | 5/2015 | Chua et al. |
| 2005/0091396 | A1 | 4/2005 | Nilakantan et al. |
| 2009/0235063 | A1 | 9/2009 | Skoric et al. |
| 2011/0149803 | A1 | 6/2011 | McCormack et al. |
| 2011/0296201 | A1 | 12/2011 | Monclus et al. |
| 2011/0296204 | A1 | 12/2011 | Henry et al. |
| 2011/0296205 | A1 | 12/2011 | Henry et al. |
| 2012/0117123 | A1 | 5/2012 | Geagan, III et al. |
| 2013/0121490 | A1* | 5/2013 | Boliek ............... H04L 9/28 380/255 |
| 2013/0191650 | A1 | 7/2013 | Balakrishnan et al. |
| 2014/0208111 | A1* | 7/2014 | Brandwine ......... H04L 63/0428 713/171 |
| 2014/0258733 | A1 | 9/2014 | Scott-Nash |
| 2014/0297979 | A1* | 10/2014 | Baron ................ G06F 3/0647 711/162 |
| 2014/0037271 | A1 | 12/2014 | Chuang et al. |
| 2015/0113132 | A1 | 4/2015 | Srinivas et al. |
| 2015/0301844 | A1 | 10/2015 | Droux et al. |
| 2016/0366041 | A1 | 12/2016 | Seenappa et al. |

OTHER PUBLICATIONS

Green Rd et al., Boot Image, Wikipedia (Downloaded 2015).
Brodkin, Box hands cloud encryption keys over to its customers, ars technica (2015).
Browne et al., Cloud Security Consciousness: A Need for Realization in Entrepreneurial Small Firms, UK Academy for Information Systems (2014).
Marko, Creating the Enterprise Cloud: A Q&A With VMware CEO Pat Gelsinger, Forbes (2014).
Arvindn et al., Cryptographic nonce, Wikipedia (Downloaded 2015).
Bradford, Decoding the Most Misleading Myths and Misconceptions of Cloud Computing, Storagecraft.com (2015).
Suh et al., Design and Implementation of the AEGIS Single-Chip Secure Processor Using Physical Random Functions, CSAIL MIT (2005).
Rodrigob et al., Field-programmable gate array, Wikipedia (Downloaded 2015).
Nurg et al., Hardware virtualization, Wikipedia (Downloaded 2015).
Bejtlich et al., How the Sony Breach Changes Cybersecurity, WSJII (2015).
Hall et al., HP buys data encryption firm Voltage in move toward cloud-based security, Silicon Valley Business Journal (2015).
Vollmar et al., Hypervisor Security in Cloud Computing Systems, ACM (2014).
Hytrust Wins 3 Additional Patents for Technology Innovation in Automated Cloud Security, heraldonline.com (2015).
Hassani et al., Multitenancy, Wikipedia (Downloaded 2015).
Hardy et al., Orchestration (computing), Wikipedia (Downloaded 2015).
Hardy et al., Root certificate, Wikipedia (Downloaded 2015).
Norton, Security Moving Into Hardware Realm, Analysts Say, WSJ (2015).
Leandrod et al., Trusted Platform Module, Wikipedia (Downloaded 2015).
Bergemann et al., Virtualization, Wikipedia (Downloaded 2015).
Berger et al., vTPM: Virtualizing the Trusted Platform Module, Security '06 USENIX Security Symposium (2006).
Derksen, Logic Analyzer, Wikipedia (Downloaded 2015).
Todorov et al., AWS Security Best Practices (2016).

* cited by examiner

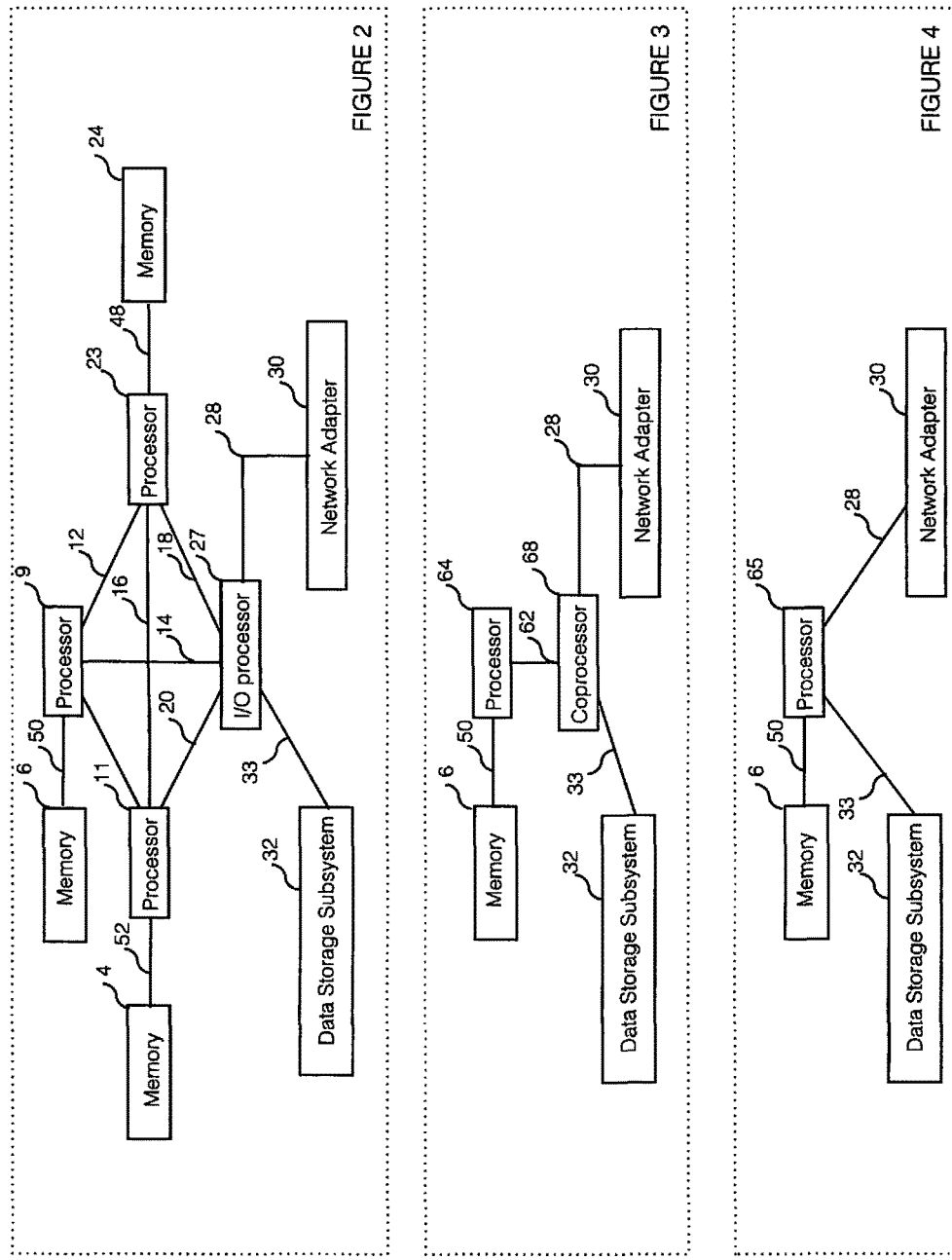

SECURE MIGRATION OF VIRTUAL MACHINES FROM SOURCE TO TARGET AND TRANSFER OF VM DESCRIPTOR AND KEYS BETWEEN PHYSICAL SERVERS

This is a divisional of U.S. application Ser. No. 14/789,916 filed on Jul. 1, 2015, which is hereby incorporated by reference herein.

BACKGROUND

The invention relates to systems, methods, and computer readable medium to implement security in computer systems.

Computer security can be difficult to define, because people use the term in many ways that depend on the context and overuse the term to sell computers and software. Despite that difficult, many agree that computer security seeks to increase confidentiality, integrity, and availability of data. Specifically, it seeks to increase confidentiality to avoid revealing data to wrong parties, integrity to prevent unauthorized changes to the data, and to increase data availability to the right parties as required.

Although the goals are simple to state, computer security is one of the most challenging problems facing cloud computing and data centers. The basic problem is cloud computing and data centers are networked to many computers, and networks involve layers that are vulnerable to many forms of attack. Another security issue is cloud computing and data centers support multiple tenants (customers sharing computing resources) which may permit a tenant to hack into another tenant's resources. See *Wikipedia Multitenancy* (2015), which is incorporated by reference herein, describes details of multitenancy.

Further, software is inherently not secure because it can include millions of lines of code, and it is impossible to discover all vulnerabilities and points of attack that can be exploited. Software companies are constantly releasing security patches and updates to protect against software vulnerabilities. Further, the security patches sometimes have bugs and produce new vulnerabilities. Unfortunately, hackers or even criminals and terrorists are working globally to penetrate software and patches and the security mechanism used to protect cloud computing systems. Further, zero-day attacks unknown to software vendors until after the damage is done, cannot be fully addressed by security patches. It seems the good guys are one step behind and not winning, at least consistently. And the press regularly informs that criminals are hacking into computing systems to steal sensitive and private information such as customer identity, social security numbers, and credit card information. For example, TARGET suffered a data breach where criminals stole credit card and personal information of more than 110 million customers in 2013. And Identity Theft Resource Center, ITRC reported 480 data breaches exposing 17 million customers in 2014.

Further, the public may not immediately hear about data breaches because the data center or the cloud provider may seek to fix the problem before reporting the data breach to its customers. Perhaps it may fear loss of customer trust. Thus, cloud and data centers are both seeking for ways to make computing more secure.

Virtualization technology is growing in popularity for many reasons including increased data availability and lowered computing costs. Because virtual machines serve as a foundation of cloud computing and data centers, certain security issues they present cannot be ignored.

Virtual machines present the illusion that each virtual machine known as a guest has the entire physical server known as a host. Thus, instead of a single operating system owning the physical server, multiple operating systems can share the same physical server. Each operating system runs in a virtual machine. The hypervisor is the software that permits this by mapping the virtual resources to the physical resources. This ability to manage different operating systems and applications on a single physical server can dramatically lower operating costs. Virtualization technology also gives the flexibility to resize the amount of computing resources to match the demand.

However, cloud providers cannot provide full assurance of secure computing and data to users. For example, a bad acting tenant on the cloud or data center may attack other tenants or the cloud infrastructure through the network or even through an attack on the hypervisor. As a result, some organizations are not willing to bear the added security risk and fail to fully benefit from the public cloud's advantages. Further, many companies and organizations choose to build a private cloud on their own premises. Future regulations and customer demands will require the public cloud providers and private cloud suppliers to implement security means in order to prevent hostile usage by tenants and malicious exploitation of cloud resources by cloud employees. The issue of computer security is impeding or preventing adoption of data centers and cloud computing.

SUMMARY OF THE INVENTION

The invention relates to systems, methods and computer readable medium to implement security in computers.

A method of computer security includes executing on one or more servers of a cloud or data center, the steps of receiving a network identifier for a plurality of functions from a cloud or data center manager, requesting a network key for each function from key server(s) or from a local key generator based on one or multiple secrets, allocating a plurality of isolated network interfaces based on a cloud or data center provider and/or customer requirements, requesting a virtual network interface controller allocation per function per virtual machine, requesting from the key server a network key for each cloud or data center function, receiving a storage identifier for a plurality of functions from a cloud or data center manager, requesting a storage key for each cloud or data center function from key server(s) or from a local key generator based on one or multiple secrets, allocating a plurality of isolated virtual storage disks based on a cloud or data center provider and/or customer requirements, requesting a storage controller allocation per function per virtual machine, and requesting from the key server a storage key for each cloud or data center function.

A method of securing the migration of a virtual or physical machine from a source server to a target server includes executing on one or more servers the steps of requesting a public key from the target server, transmitting the target's public key to the source server, encrypting the virtual machine descriptor with the target's public key, decrypting the virtual machine descriptor using the target's private key, and restoring a virtual machine associated with the virtual machine descriptor on the target server.

In another feature, a non-transitory computer-readable medium encodes a program for executing on one or more servers the above method.

A computing system, includes a server including multiple cores dedicated to compute functions, wherein each core is dedicated to a single compute function, a key management server is configured to generate and issue a unique secret key to each core to encrypt the data of each compute function to isolate the data from another compute function, and a shared memory is accessed by one or more of the multiple cores configured to store the data of each function, wherein the security of the encrypted data of each compute function is isolated by a secret key obtained from the key management server.

A method of transferring a virtual machine descriptor and associated keys through a key management server from a first physical server to a second physical server includes sending a storage key management server (KMS) public key to a first physical server, sending the storage KMS public key to a second physical server, encrypting the first physical server key with the KMS public key and sending the encrypted first physical server key to the storage KMS, encrypting the second physical server key with the KMS public key and sending the encrypted second physical server key to the storage KMS, sending the first physical server key to a virtual machine (VM) to encrypt the VM descriptor, encrypting the VM storage key(s) with the first physical server key and sending it to the VM KMS, sending the encrypted VM storage key(s) to the storage KMS, decrypting the VM storage key(s) with the first physical server key and encrypting it with the second physical server key, sending the VM storage key(s) encrypted with the second physical server key to the VM KMS, sending the VM storage key(s) encrypted with the second physical server key to the second physical server, sending the second physical server key to the VM at the second physical server to decrypt the VM storage key(s), transferring the VM descriptor from the first physical server to the second physical server, and decrypting VM storage key(s) using the second physical server key.

A non-transitory computer-readable medium encodes programs used to transfer a virtual machine from a first physical server to a second physical server comprising instructions stored thereon that when executed on server(s) perform the steps of the method.

BRIEF DESCRIPTION OF THE DRAWINGS

FIG. 2 illustrates a hardware architecture including multiprocessor and I/O processor in a server that implements an embodiment of the invention.

FIG. 3 illustrates a hardware architecture including a processor and a coprocessor in a server that implements an embodiment of the invention.

FIG. 4 illustrates a hardware architecture including a processor in a server that implements an embodiment of the invention.

DETAILED DESCRIPTION OF THE PREFERRED EMBODIMENTS

The following description includes the best mode of carrying out the invention. The detailed description illustrates the principles of the invention and should not be taken in a limiting sense. The scope of the invention is determined by reference to the claims. Each part (or step) is assigned its own part (or step) number throughout the specification and drawings. The method drawings illustrate a specific sequence of steps, but the steps can be performed in parallel and/or in different sequence to achieve the same result.

Figure 1:
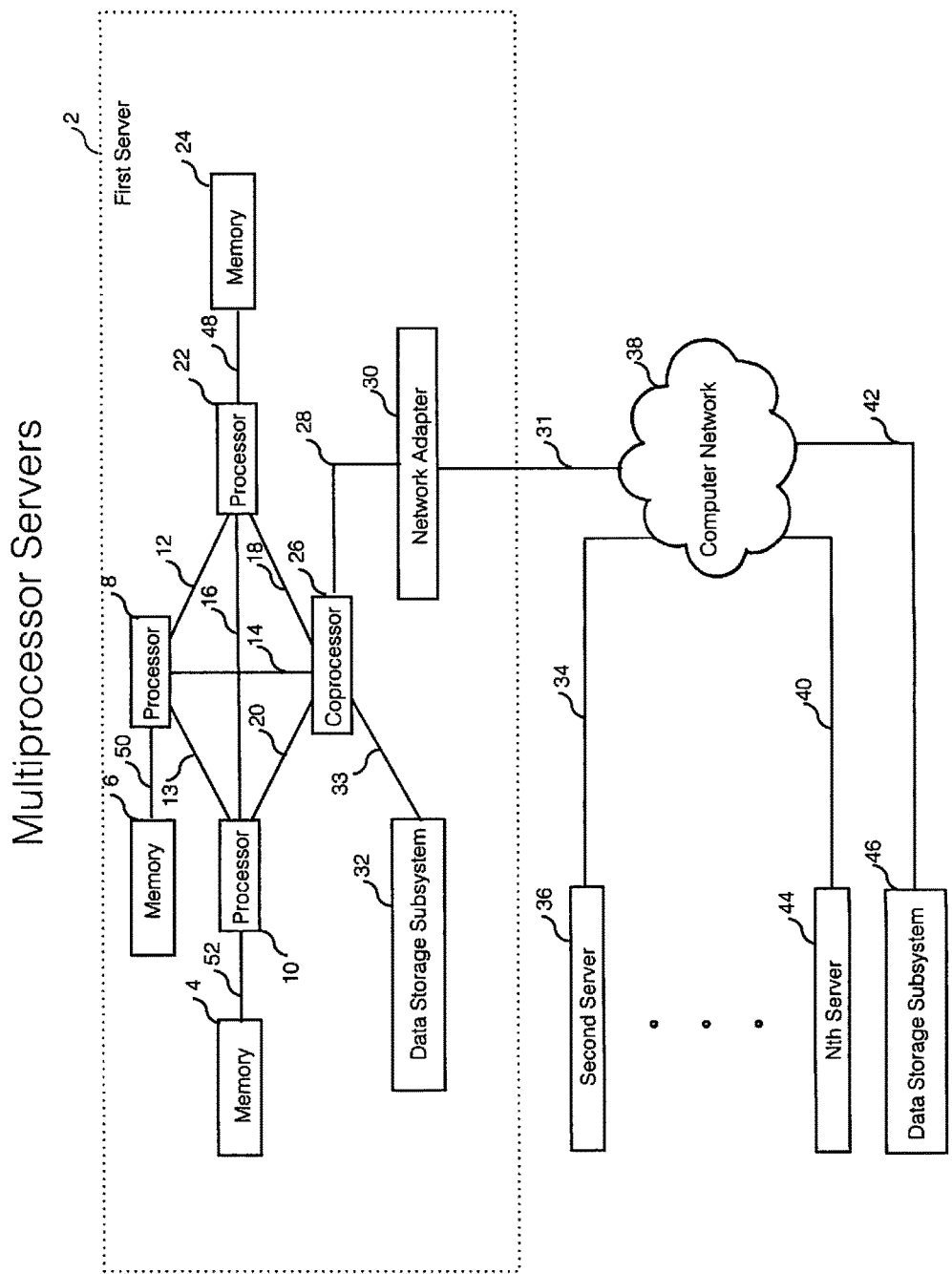
FIG. 1 illustrates a hardware architecture including multiprocessors and coprocessor in server(s) that implements an embodiment of the invention.

FIG. 1 illustrates a hardware architecture including multiprocessors and coprocessor in server(s) that implements an embodiment of the invention.

As shown, a cluster of servers can execute the invention as described below. Each server is a computer that can communicate with other computers and data storage subsystems. Hennessy and Patterson, *Computer Architecture: A Quantitative Approach* (2012), and Patterson and Hennessy, *Computer Organization and Design: The Hardware/Software Interface* (2013), which are incorporated by reference herein, describe computer hardware and software, storage systems, caching, and networks.

As shown in FIG. 1, a first server 2, which is representative of the second server 36 through Nth server 44, includes a motherboard with CPU-memory buses 48, 50, and 52 that communicate between, respectively, a processor 22 and a memory 24, a processor 8 and a memory 6, and a processor 10 and a memory 4. In addition, each processor (e.g., processor 10) has connects 12, 13, 14, 16, 18, and 20 to all of the other processors (e.g. processors 8 and 22) and a coprocessor 26. In the embodiment, the coprocessor 26 will be described further in connection with other drawings, but the processors used are not essential to the invention and could be any suitable general-purpose processor running software (e.g. Intel Xeon), an ASIC dedicated to perform the operations described herein or a field-programmable gate array (FPGA). *Wikipedia Field-programmable gate array* (2015), which is incorporated by reference herein, describes details regarding FPGAs. Each of processors 8, 10, and 22 can read and write data to their respective memory 6, 4, and 24 and/or through a link 33 to a data storage subsystem 32 (e.g., a disk, disk array, and/or solid state disk).

Also, one could implement the invention using a single processor in each server or more than two processors to meet various performance requirements. The arrangement of the processors is not essential to the invention. Data is defined as including user data, instructions, and metadata.

A non-transitory computer-readable medium (e.g., a suitable storage device, such as a hard disk drive, solid state disk (SSD), CD, DVD, USB storage device, secure digital card (SD) card, or floppy disk) can be used to encode the software program instructions described in the methods below.

Each server runs an operating system such as Apple's OS X, Linux, UNIX, a Windows OS, or another suitable operating system. Anderson, et al., *Operating Systems-Principles and Practice* (2014), and Bovet and Cesati, *Understanding the Linux Kernel* (2005), which are incorporated by reference herein, describe operating systems in detail.

The coprocessor 26 of the first server 2 communicates through a link 28 with a network adapter 30 which in turn communicates over a link 31 with a computer network 38 with other servers. Similarly, the second server 36 communicates over a link 34 with the computer network 38, and the Nth server 44 communicates over link 40 with the computer network 38. In sum, the first server 2, the second server 36, and the Nth server 44 communicate with each other and with the computer network 38. A data storage subsystem 46 communicates over link 42 with computer network 38. The link 34, the link 40, the link 46, and the computer network 38 can be implemented using a bus, SAN, LAN, or WAN technology such as Fibre Channel, SCSI, InfiniBand, Ethernet, or Wi-Fi.

FIG. 2 illustrates another embodiment of the hardware architecture. In this embodiment, the processors 9, 11 and 23 and the I/O processor 27 perform the functions performed by the coprocessor 26 of FIG. 1. The server includes a motherboard with CPU-memory buses 48, 50, and 52 that communicate between, respectively, a processor 23 and a memory 24, a processor 9 and a memory 6, and a processor 11 and a memory 4. Each processor (e.g., processor 11) connects to the other processors (e.g. processors 9 and 23) and an I/O processor 27, which communicates through a link 28 with a network adapter 30 and through a link 33 with a data storage subsystem 32.

FIG. 3 illustrates another embodiment of the hardware architecture. The server now includes a motherboard with a processor 64 that communicates with a memory 6 through a CPU-memory bus 50 and with a coprocessor 68 through a bus 62. The coprocessor 68 also communicates with a data storage subsystem 32 through a link 33 and with a through a link 28 to a network adapter 30.

FIG. 4 illustrates another embodiment of the hardware architecture. The server includes a processor 65 that implements the hardware described in FIG. 1 and performs the methods described below. For example, the processor 65 is an ASIC or FPGA coprocessor integrated with the main processor (e.g., Xeon or ARM processor). The processor 65 communicates with a memory 6 through a CPU-memory bus 50 and with a data storage subsystem 32 through a link 33 and with a network adapter 30 through a link 28.

Virtualization technology serves as the foundation of the cloud computing; it allows one to host one or more virtual machines (VMs) on a single physical server. The software that creates, runs, and manages the VMs is referred to as the hypervisor. The hypervisor determines how to map virtual resources to physical resources. A physical resource can be time-shared (e.g., network interfaces), partitioned (e.g., sectors and tracks of disks), or emulated. VMWARE, MICROSOFT, and ORACLE all produce hypervisors. The virtual machines are a group of files. Virtual hard disk (VHD) files hold data. XML files hold configuration details. AVHD files store changes between data in storage and the previous snapshot. VSV files hold saved state of the data. BIN files hold the memory for systems. *Wikipedia Hardware virtualization* (2015), which is incorporated by reference herein, describes the details of hardware virtualization. *Hypervisor Security in Cloud Computing Systems*, which is incorporated by reference herein, describes the details of hypervisor security. *Wikipedia Virtualization* (2015), which is incorporated by reference herein, describes the details of virtualization.

Figure 5:
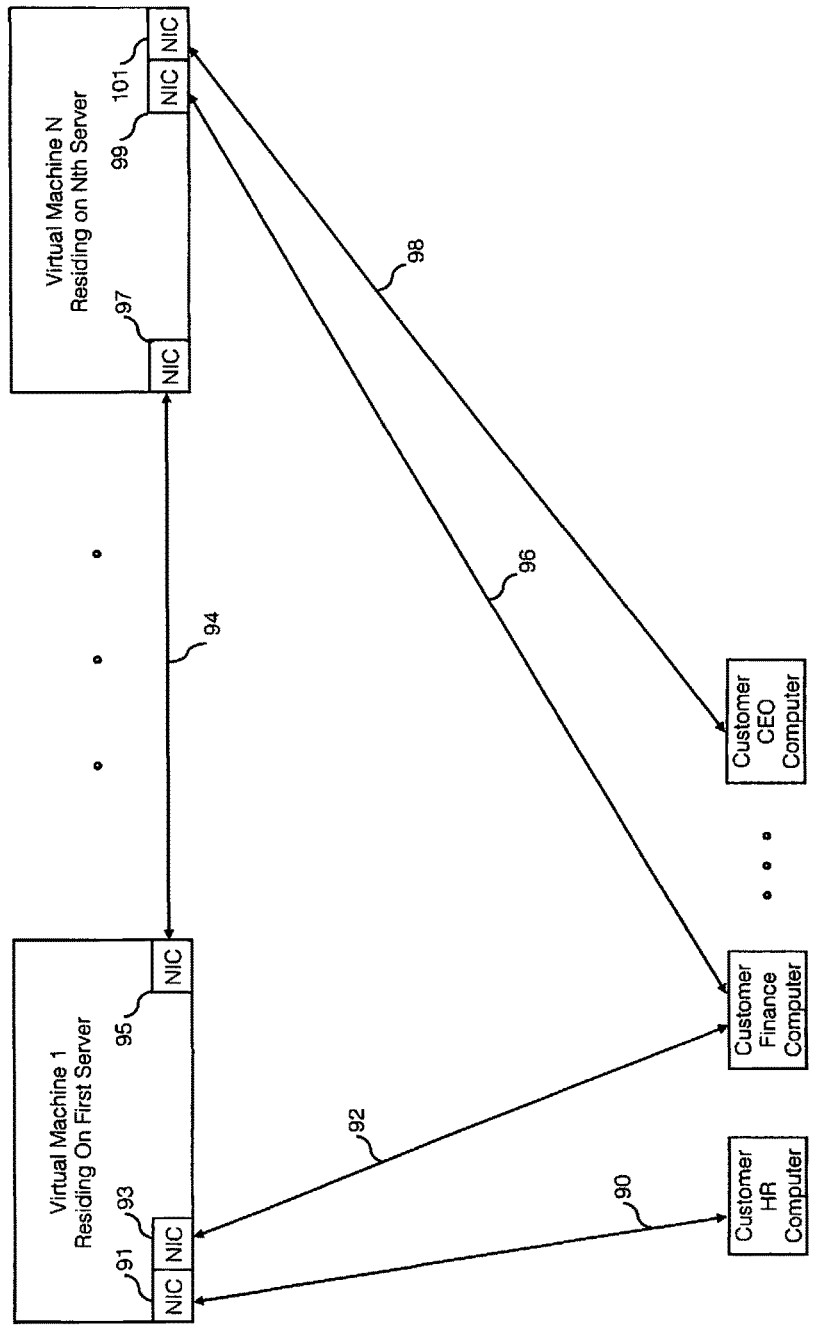
FIG. 5 illustrates virtual machines on servers with virtual network interface controllers, where each controller is dedicated to a customer function and communicates in a secured local area network.

FIG. 5 illustrates a plurality of virtual machines residing on physical servers such as those shown in FIGS. 1, 2, 3, and 4. In an embodiment, each server could be implemented on a virtual machine hosted by VMWARE, HYPER-V, or open source software Xen. In an embodiment, each server could be implemented on a virtual machine hosted by VMWARE, HYPER-V, or open source software Xen. Tanenbaum, *Modern Operating Systems* (2008) describes virtualization at pages 568-580, Lowe et al. *Mastering VMware vSphere 5.5* (2013) describes the VMWARE virtualization software in detail and Matthews et al., *Running Xen: A Hands-On Guide to the Art of Virtualization* (2008) describes the free open source Xen virtualization software in detail and Hennessy & Patterson, Computer Architecture—A Qualitative Approach (2012), which is incorporated by reference herein, describes virtual machines and virtualization at pages 105-111 (collectively "the virtualization literature"), which are incorporated by reference herein.

In various embodiments, the server(s) are implemented by one or more computers in a data center such as AMAZON WEB SERVICES, GOOGLE COMPUTE ENGINE, Microsoft AZURE, or RACKSPACE. Murty, *Programming Amazon Web Services: S3, EC2, SQS, FPS, and SimpleDB* (2008) describes the AMAZON WEB SERVICES in detail and Sanderson, *Programming Google App Engine* (2012) describes the GOOGLE APP ENGINE in detail (collectively "the data center literature"), which are incorporated by reference herein.

As shown, the virtual machine 1 residing on a first server (e.g., FIG. 1, 2, 3, or 4) has a plurality of virtual network interface controllers (NIC) 91, 93, and 95. In an embodiment, the hypervisor of the virtual machine keeps track of messages for the virtual network addresses to ensure the guest virtual machines only receive messages intended for it. The virtual NIC 91 communicates with the customer human resource (HR) computer through a link 90. Virtual NIC 93 communicates with the customer finance computer through a link 92. As shown, Virtual NIC 95 is not yet allocated or communicating with any computer.

A virtual machine N residing on Nth server (e.g., FIG. 1, 2, 3, or 4) has a plurality of virtual network interface controllers (NIC) 97, 99, and 101. The virtual NIC 99 communicates with the customer finance computer through the link 96. Virtual NIC 101 communicates with the customer CEO computer through a link 98. Virtual NIC 97 is not yet allocated or communicating with any computer.

The various embodiments of the invention use encryption to protect the confidentiality of data. "Data at rest" is data stored on a computer readable medium such as a hard disk drive or solid state disk. "Data in transit" is data moving over a network. In various embodiments, the encrypted data moving over the network is the payload of the packets and frames rather than the headers. In the embodiments, we use the fact it is much more difficult for an unauthorized user to view encrypted data than data in plaintext. In general, encryption uses key-based algorithms to encrypt data (e.g., a message into an unreadable message) that is stored or transmitted as ciphertext. Decryption uses the key-based algorithms to recover the original message.

There are two types of key-based algorithms that are used in the various embodiments.

Symmetric encryption uses the same key to encrypt and decrypt the message. A block cipher which divides a message or file and encrypts in a block (e.g., 64-bit or 128-bit) or a stream cipher which encrypts by bytes or bits. Stream ciphers are more efficient than block ciphers. Advanced Encryption Standard (AES) is a suitable symmetric 128-bit block cipher and Blowfish is a suitable 64-bit block cipher. Because a secret key must be shared by the sender and recipient it is preferred the encryption key is not reused.

Asymmetric encryption uses two keys in a matched pair. Private keys are secret and not shared. Public keys are freely shared. If a server encrypts data with the public key, only the owner of that public key who has the matching private key can decrypt it.

Asymmetric encryption requires a certificate and public key infrastructure (PKI) made up of hardware, software, people, policies, and procedures needed to create, manage, distribute, use, store, and revoke digital certificates. In cryptography, a PKI is an arrangement that binds public keys with respective user identities by means of a certificate authority (CA) such as VeriSign, which is a well-known public CA.

Asymmetric encryption can provide strong security, but requires more computing resources. Thus, in embodiments, the invention may use asymmetric encryption to privately share a symmetric key then use the symmetric key to encrypt and decrypt the data. In an embodiment that implements out-of-band key exchange, the symmetric key is transmitted over a network link that is separate the network link that carries the encrypted data. Schneier, *Applied Cryptography* (1996, 2nd Edition), which is incorporated by reference herein, describes other details of cryptography.

In an embodiment, the invention uses separate encryption (e.g., symmetric or asymmetric) to protect the confidentiality of data (e.g., message) in transmission. Thus, the encryption uses a separate symmetric key (or separate set of matched pair of keys) for encrypted communication on each link (e.g., 90 and 92) to each customer function (e.g., HR computer 90 and CEO computer 98). This separate encryption will compartmentalize any data breach and keeps each function safer if an attacker successfully hacks into a given link (e.g., learns the secret key) and secures that part of the local area network.

Figure 6:
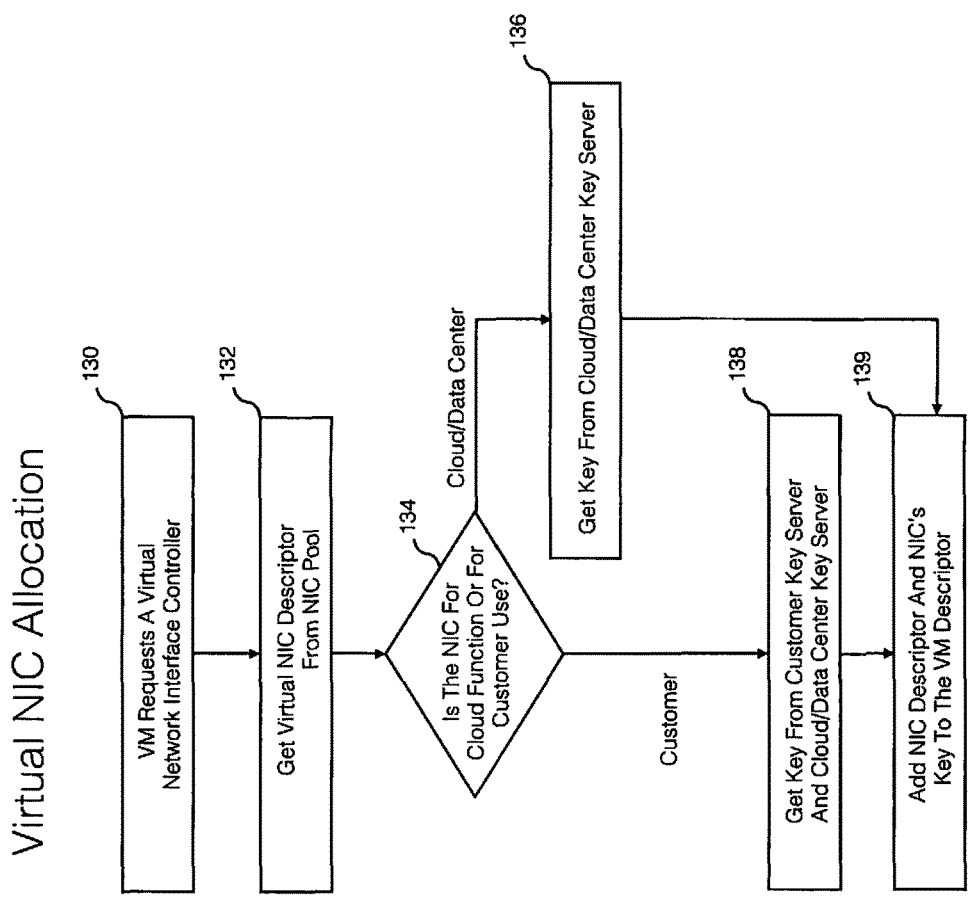
FIG. 6 illustrates a method of virtual network interface controller (NIC) allocation.

FIG. 6 illustrates a method of virtual network interface controller (NIC) allocation. As shown, at step 130 the virtual machine (VM) requests a virtual network interface controller (NIC). At step 132, the virtual machine gets a virtual NIC descriptor from the NIC pool. At step 134, the virtual machine tests if the NIC is for the cloud or data center function or for customer use. If for a cloud or data center function, the virtual machine will get the key from the cloud or data center key server at step 136. If for a customer function, the virtual machine will get the key from the customer key server and the cloud or data center key server at step 138. At step 139, the virtual machine adds the NIC descriptor and the NIC's key to the VM descriptor.

Figure 7:
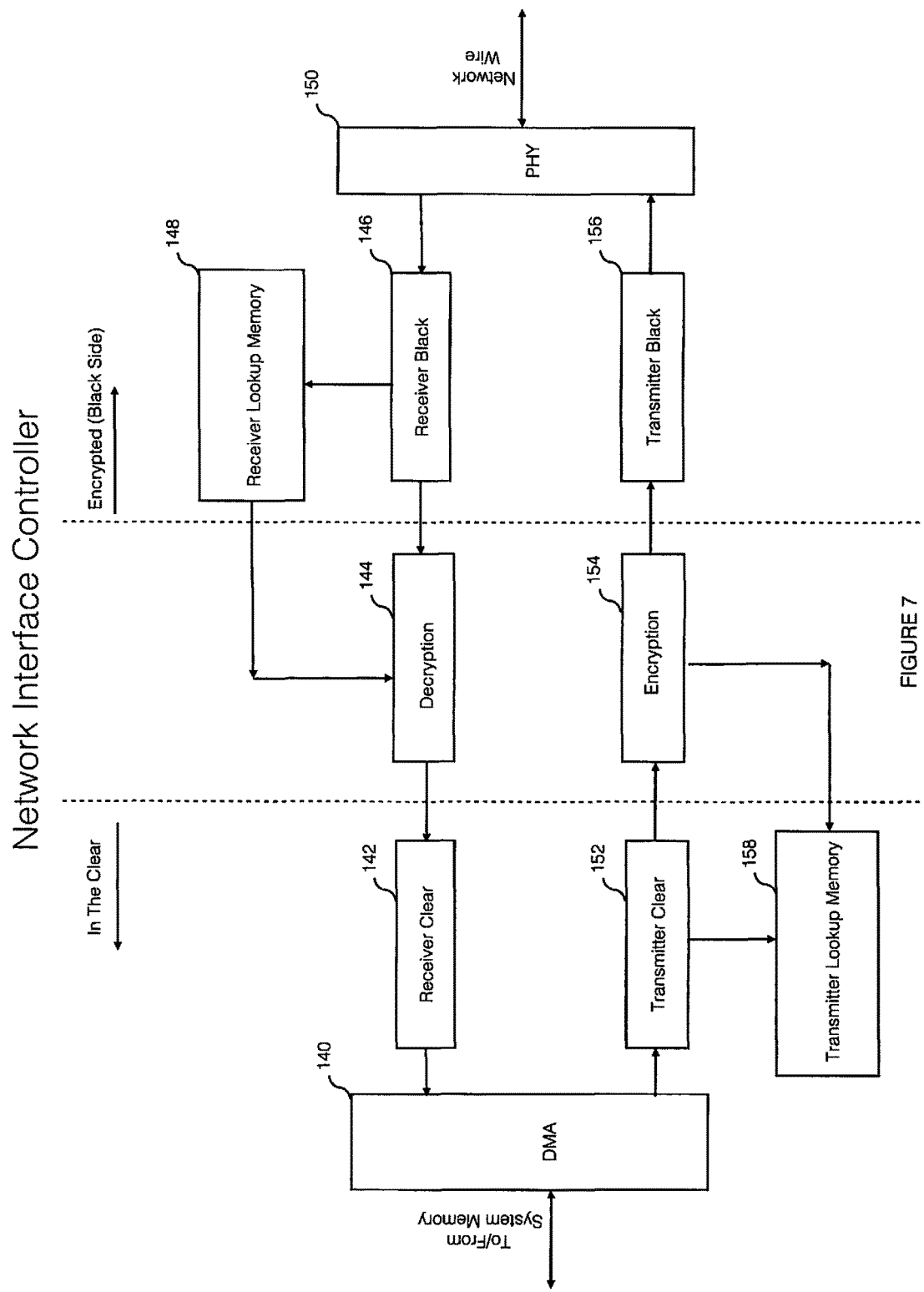
FIG. 7 illustrates an embodiment of a physical network interface controller (NIC).

FIG. 7 illustrates details of a physical network interface controller (NIC) that was illustrated at a high level in FIGS. 1-4. Each function is represented by a block. As shown, the NIC has an encryption and decryption path. The NIC is shown with the clear side on the left and an encrypted (black side) on the right. For encryption the data is transmitted from the system memory shown on the left by direct memory access (DMA) 140 to a transmitter clear 152, which is coupled to the transmitter lookup memory 158, an encryption 154, transmitter black 156, to PHY 150 to the network wire shown on the right. For decryption the data is transmitted from the network wire shown on the right to PHY 150 to receiver black 146, which is coupled to receiver lookup memory 148, to decryption 144, to receiver clear 142, and to the DMA 140, to the system memory shown on the left.

Figure 8:
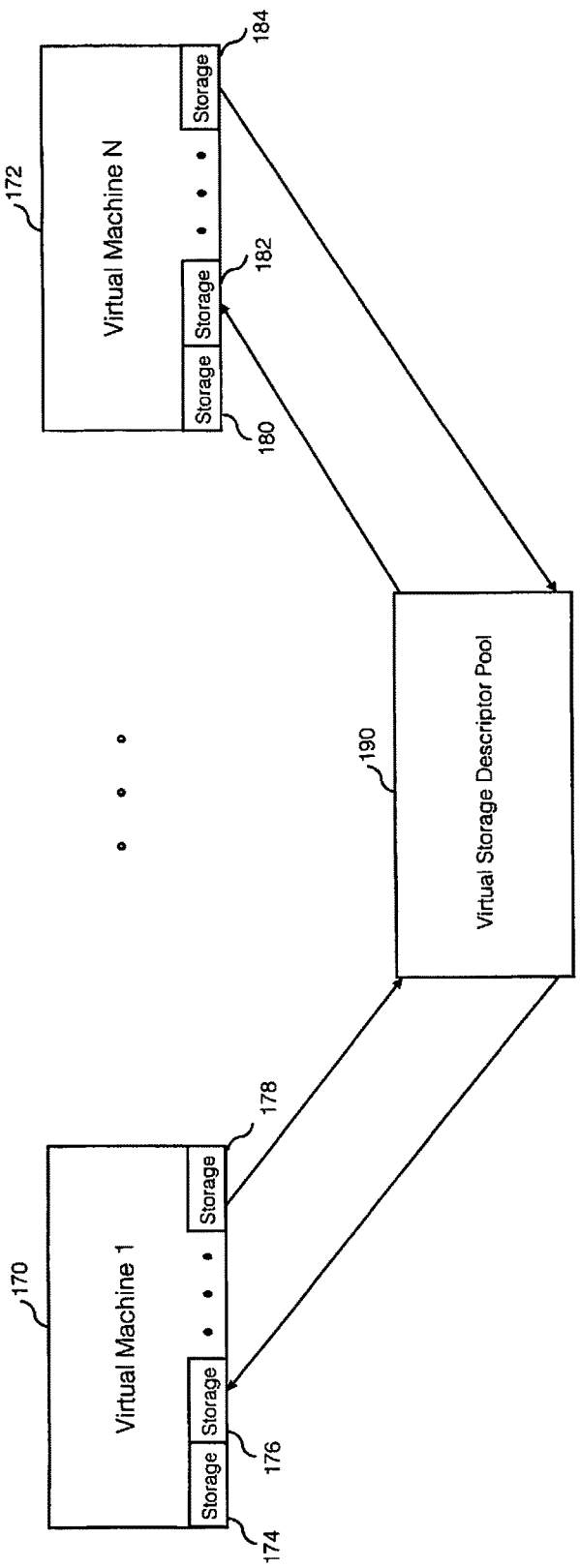
FIG. 8 illustrates virtual machines on servers with virtual storage controllers that communicate with a virtual storage descriptor pool.

FIG. 8 illustrates virtual machines on servers with virtual storage controllers that are allocated from a virtual storage descriptor pool. As shown, a plurality of virtual machines reside on physical servers such as those shown in FIGS. 1, 2, 3, and 4. In an embodiment, each server is implemented as a virtual machine hosted by VMWARE, HYPER-V, or open source software Xen. As before the virtualization literature is incorporated by reference herein. In various embodiments, physical server(s) are implemented by one or more computers in a data center such as AMAZON WEB SERVICES, GOOGLE COMPUTE ENGINE, Microsoft AZURE, or RACKSPACE. As before the data center literature is incorporated by reference herein.

As shown, the virtual machine 1 residing on a first server (e.g., FIG. 1, 2, 3, or 4) requires a plurality of virtual storage controllers (e.g., storage controllers 174, 176, and 178). The virtual storage controller 176 is allocated from the virtual storage descriptor pool 190. As shown, the virtual storage controller 174 was previously allocated. If the virtual machine 1 is removed from service, the virtual storage controller 174, 176, and 178 are de-allocated to the virtual storage descriptor pool 190.

A virtual machine N residing on Nth server (e.g., FIG. 1, 2, 3, or 4) requires a plurality of storage controllers (e.g., storage controllers 180, 182, and 184). The virtual storage controller 182 is allocated from the virtual storage descriptor pool 190. As shown, the virtual storage controller 180 was previously allocated. If the virtual machine N is removed from service, the virtual storage controller 184 is de-allocated to the virtual storage descriptor pool 190.

Because of separate encryption for each virtual storage controller, the data stored through that storage controller is kept safer from an attack.

Figure 9:
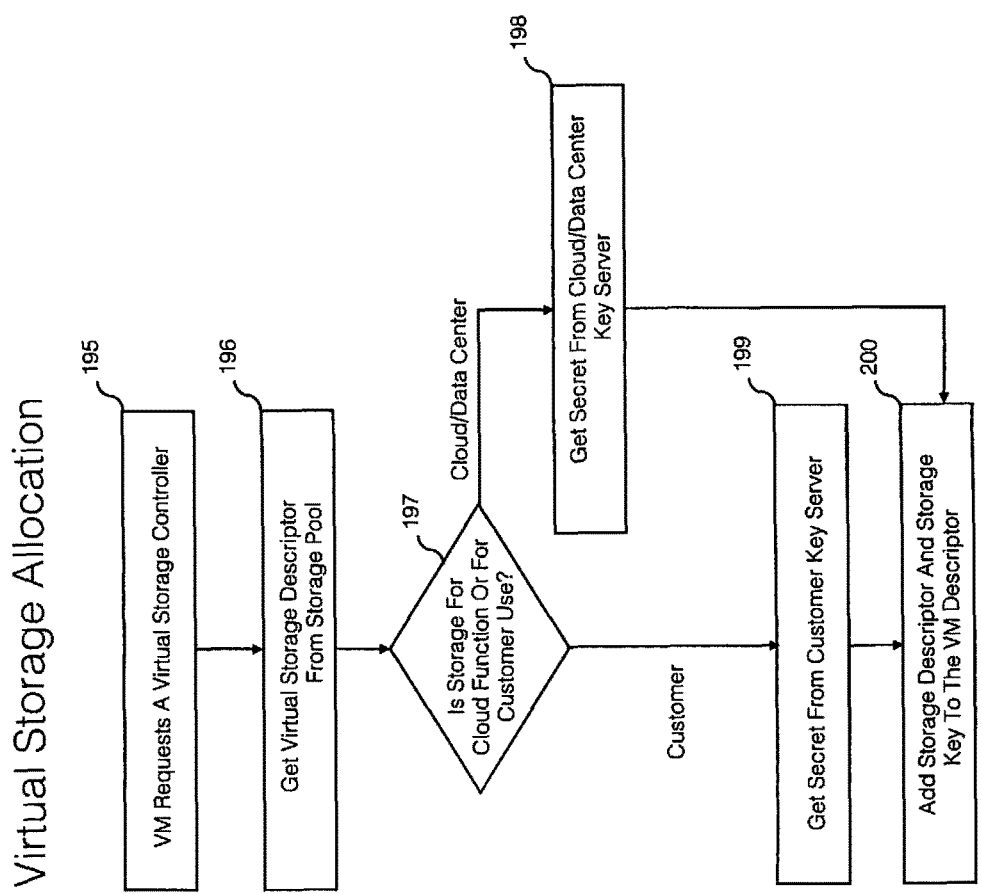
FIG. 9 illustrates a method of virtual storage controller allocation.

FIG. 9 illustrates a method of virtual storage controller allocation. As shown, at step 195 the virtual machine (VM) requests a virtual storage controller. At step 196, the virtual machine gets a virtual storage descriptor from the storage pool. At step 197, the virtual machine will test if the storage is for a cloud or data center function or customer use. If for a cloud or data center function, the virtual machine will get a secret from the cloud or data center key server at step 198. If for a customer function, the virtual machine will get a secret (e.g., password, fingerprint, or retina) from the customer key server at step 199. In an embodiment, the secret can be an arbitrary number that is only used once in cryptographic communications, which is sometimes referred to as a nonce. *Wikipedia Cryptographic nonce* (2015), which is incorporated by reference herein, describes details of a cryptographic nonce. At step 200, the virtual machine adds the storage descriptor and the storage key to the VM descriptor.

Figure 10:
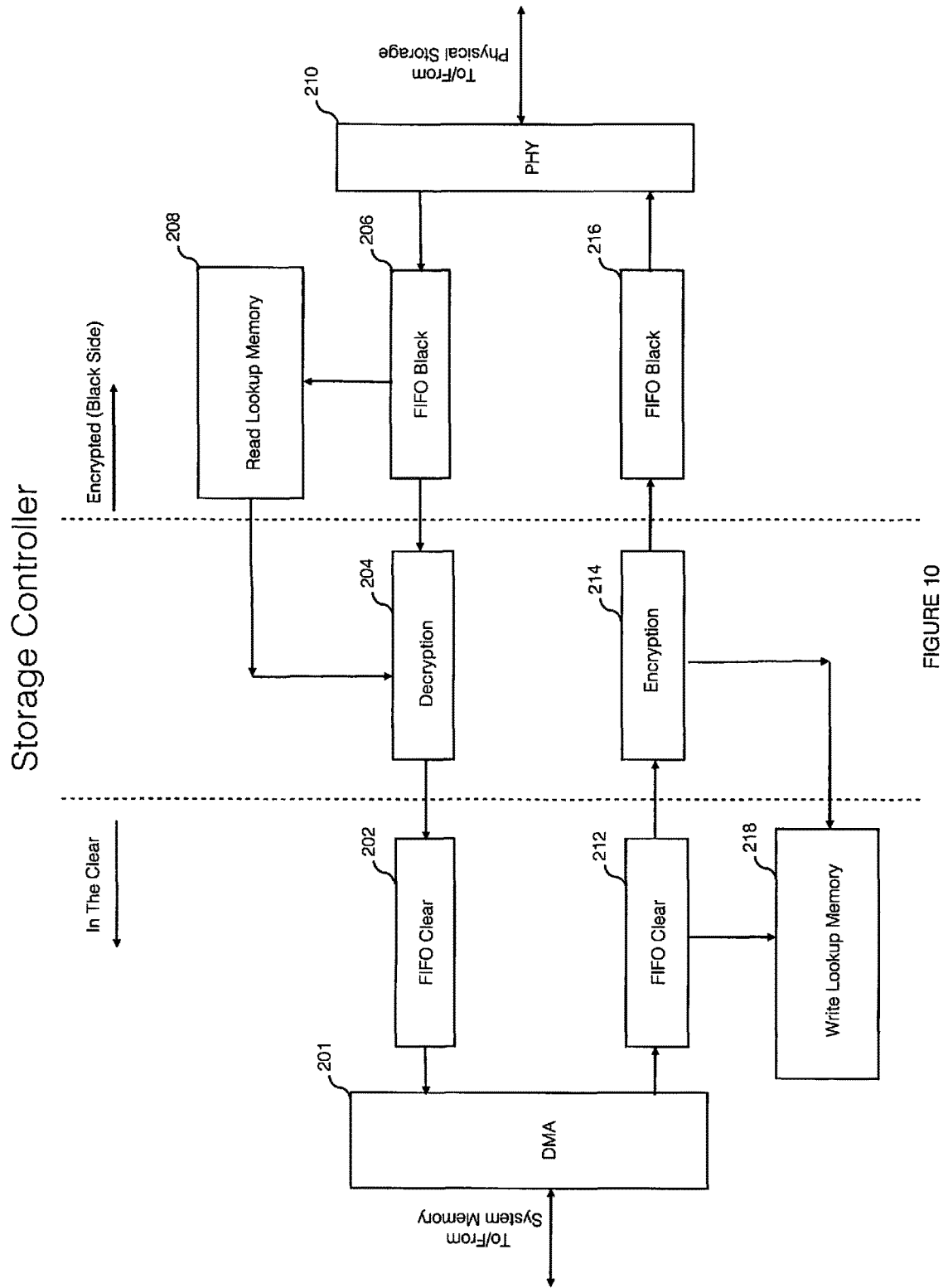
FIG. 10 illustrates an embodiment of a physical storage controller.

FIG. 10 illustrates an embodiment of a physical storage controller that was illustrated at a high level in FIGS. 1-4. Each function is represented by a block. As shown, the storage controller has an encryption and decryption path. The storage controller is shown with the clear side on the left and an encrypted (black side) on the right. For encryption the data is transmitted from the system memory shown on the left by direct memory access (DMA) 201 to a first-in-first out (FIFO) clear 212, which is coupled to the write lookup memory 218, an encryption 214, FIFO black 216, to PHY 210 to the physical storage shown on the right. For decryption the data is transmitted from the physical storage shown on the right to PHY 210 to FIFO black 206, which is coupled to read lookup memory 208, to decryption 204, to FIFO clear 202, and to the DMA 201, to the system memory shown on the left.

Figure 11:
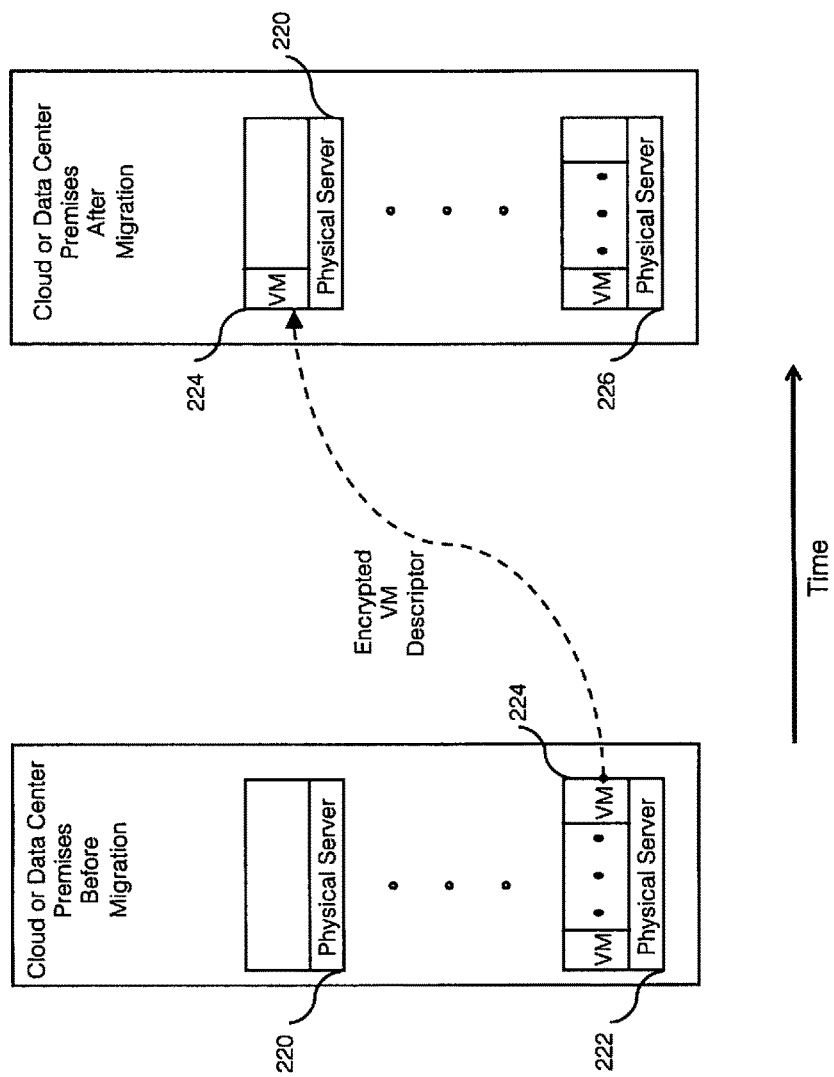
FIG. 11 illustrates a virtual machine migration from a first server to a second server.

As we noted earlier, a VM is a group of files that can be moved from one physical server to another. FIG. 11 illustrates a virtual machine migration from a first server to a second server. As shown, the cloud or data center premises before the migration include a plurality of physical servers (e.g., servers 220 and 222) that can be implemented as shown in FIGS. 1-4. One or more virtual machines (VM) such as VM 224 run on each physical server. Congestion, load balancing, maintenance, and/or failure of a first server (e.g., server 222) may prompt the need to migrate a virtual machine from a first server to a second server 220). Thus, for example, the orchestration layer of the cloud or data center premises may migrate VM 224 from the physical server 222 to the physical server 220 by transmitting an encrypted VM descriptor. Each VM has its own encrypted VM descriptor that is unknown and not accessible to all of the other VMs. *Wikipedia Orchestration (computing)* (2015), which is incorporated by reference herein, describes the details of orchestration.

Figure 12:
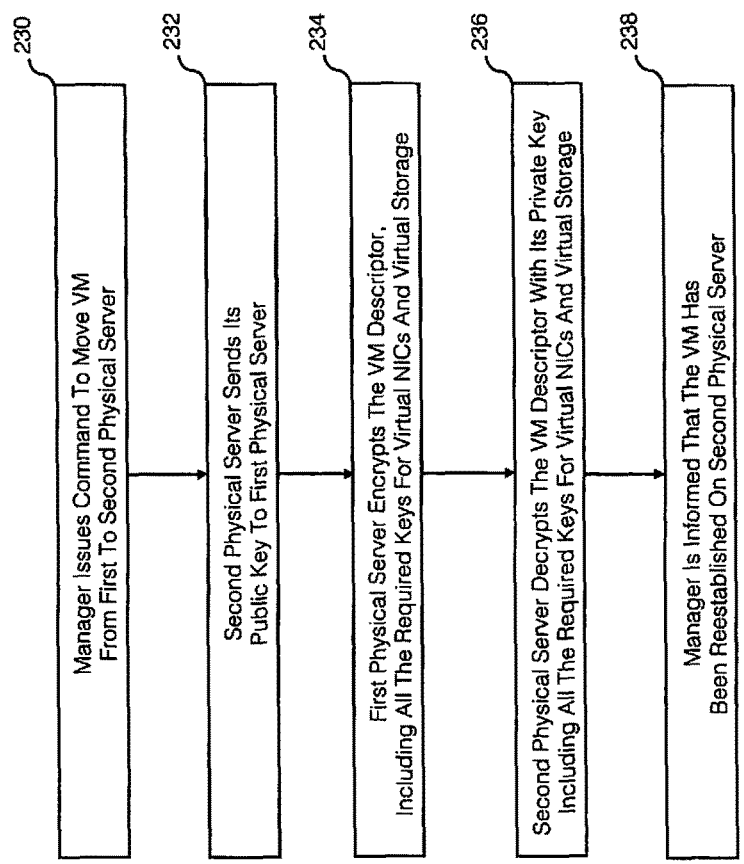
FIG. 12 illustrates a peer to peer virtual machine descriptor transfer.

FIG. 12 illustrates a method for virtual machine descriptor transfer as shown in FIG. 11. As shown the transfer is done at a peer to peer level. At step 230, the orchestration layer instructs the cloud or data center manager to issue a command to move a virtual machine (VM) from a first physical server to a second physical server. At step 232, the second physical server sends it public key to the first physical server. At step 234, the first physical server encrypts the virtual machine (VM) descriptor including all of the required keys for virtual network interface controller (NICs) and virtual storage. At step 236, the second physical server decrypts the VM descriptor with its private key including all of the required keys for virtual network interface controller (NICs) and virtual storage. At step 238, the orchestration layer informs the cloud or data center manager that the virtual machine (VM) has been reestablished on the second physical server.

Figure 13:
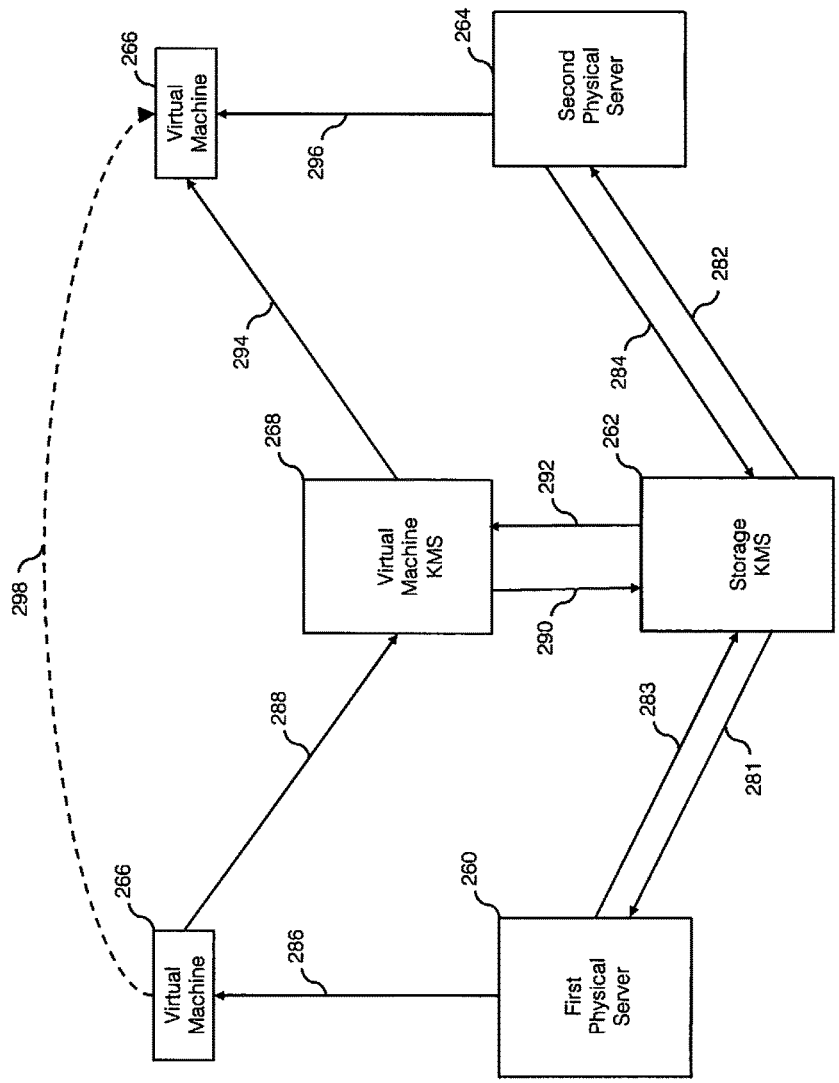
FIG. 13 illustrates a virtual machine migration from a first physical server to a second physical server in conjunction with key management servers.

FIG. 13 illustrates an embodiment of a virtual machine migration from a first physical server to a second physical server in conjunction with key management servers.

Campana, *AWS Key Management Service Cryptographic Details* (2014), which is incorporated by reference herein, provides background for key management services.

The virtual machine migration begins when a manager (not shown) issues a command to move a virtual machine (VM) from a first physical server to a second physical server (e.g., the servers in FIG. 1-4).

As shown in FIG. 13, the storage key management server (KMS) 262 sends its public key at step 281 to a first processor KMS 260 at a first physical server. The storage KMS 262 sends its public key at step 282 to a second processor KMS 264 at a second physical server. As described in connection with FIGS. 1-4, the first processor and second processor can be implemented as a coprocessor (FIG. 1) or as a processor (FIG. 4) that implements the methods described in the specification. The first processor KMS 260 at the first physical server encrypts its processor keys with the storage KMS public key and sends it at step 283 to the storage KMS 262. The second processor KMS 264 at the second physical server encrypts its processor keys with the storage KMS public key and sends it at step 284 to the storage KMS 262. The first processor KMS 260 at the first physical server sends its processor key at step 286 to the virtual machine 266 to encrypt the virtual machine descriptor. The virtual machine 266 encrypts its storage key(s) with its processor key obtained at step 286 and sends the encrypted storage key(s) at step 288 to the virtual machine KMS 268.

The virtual machine KMS 268 sends the encrypted storage key(s) via a separate secure channel at step 290 to the storage KMS 262. The storage KMS 262 decrypts the encrypted storage key(s) with the first processor key and encrypts it with the second processor key. The storage KMS 262 sends re-encrypted storage key(s) via a separate secure channel at step 292 to the virtual machine KMS 268. The virtual machine KMS 268 sends the re-encrypted storage key(s) at step 294 to the virtual machine 266 at the second physical server. The second processor KMS 264 at the second physical server encrypts its storage key(s) with its processor key and sends it at step 296 to the virtual machine 266. Thus, dotted line 298 represents that the virtual machine descriptor including its storage key(s) are transferred from the first physical server to the second physical server.

Figure 14:
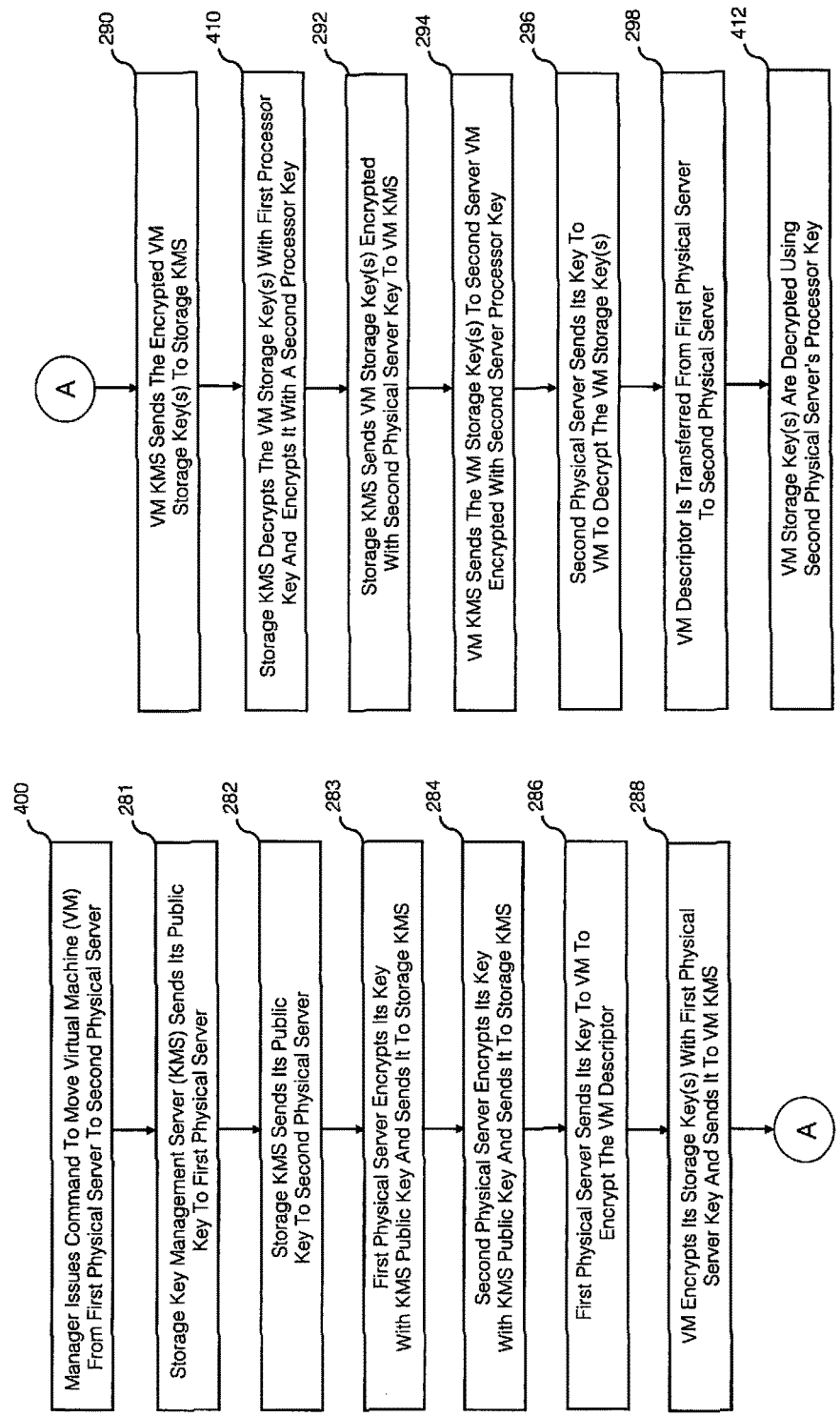
FIGS. 14A-14B illustrate a method of transferring a virtual machine descriptor and associated keys through a key management server (KMS).

FIGS. 14A-14B illustrate a method of transferring a virtual machine descriptor and associated keys through a key management server.

As shown in FIG. 14A, at step 400, a server includes a manager that issues a command to move a virtual machine (VM) from a first physical server to a second physical server. At step 281, the storage key management server (KMS) sends its public key to the first physical server. At step 282, the storage KMS sends its public key to the second physical server. At step 283, the first physical server encrypts its processor keys with the KMS public key and sends it to the storage KMS. At step 284, the second physical server encrypts its processor keys with the KMS public key and sends it to the storage KMS. At step 286, the first physical server's processor sends its key to the VM to encrypt the VM descriptor. At step 288, the VM encrypts its storage key(s) with its processor key and sends it to the VM KMS.

As shown in FIG. 14B, at step 290, the VM KMS sends the encrypted VM storage key(s) to the storage KMS via a separate secure channel. At step 410, the storage KMS decrypts the VM storage key(s) with the first processor key and encrypts it with the second processor key. At step 292, the storage KMS sends re-encrypted VM storage key(s) to the VM KMS via a separate secure channel. At step 294, the VM KMS sends the VM storage key(s) to the second server VM encrypted with the second server processor key. At step 296, the second physical server's processor sends its key to the VM at the second physical server to decrypt the VM storage key(s). At step 298, the VM descriptor is transferred from the first physical server to the second physical server. At step 412, the VM storage keys are securely extracted on the second physical server.

Figure 15:
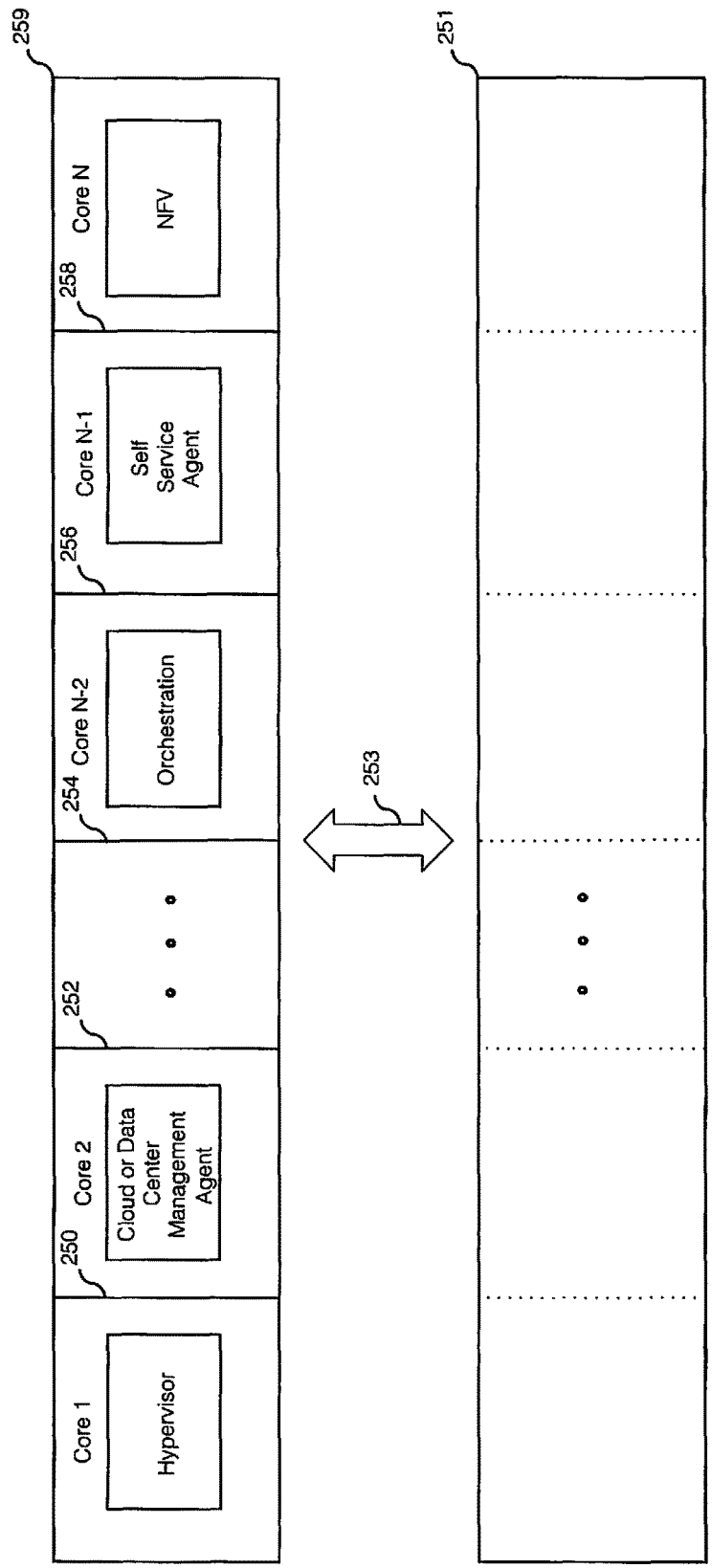
FIG. 15 illustrates a set of dedicated cores for cloud or data center functions.

FIG. 15 illustrates dedicated cores in the processors communicating with memory for cloud or data center functions. As shown in FIGS. 1-4, the servers contain various topologies for processors which contain multiple cores as shown in FIG. 15.

As shown in FIG. 15, the processor 259 includes cores 1-N, including a hypervisor dedicated core 1, a cloud or data center management agent core 2, an orchestration core N-2, a self service agent core N-1, and a network function virtualization (NFV) core N. In the embodiment, a set of virtual or physical walls 250, 252, 254, 256, and 258 that isolate the computations of each core and prevent a security breach from propagating from one core to another core. In an embodiment, the virtual or physical walls indicate that the cores do not share cache (e.g., multilevel cache) which provides further security. Also as shown, the dedicated cores 1-N communicate through a CPU-memory bus 253 with memory which has a set of virtual or physical walls that separate the data stored in memory for each dedicated core.

Figure 16:
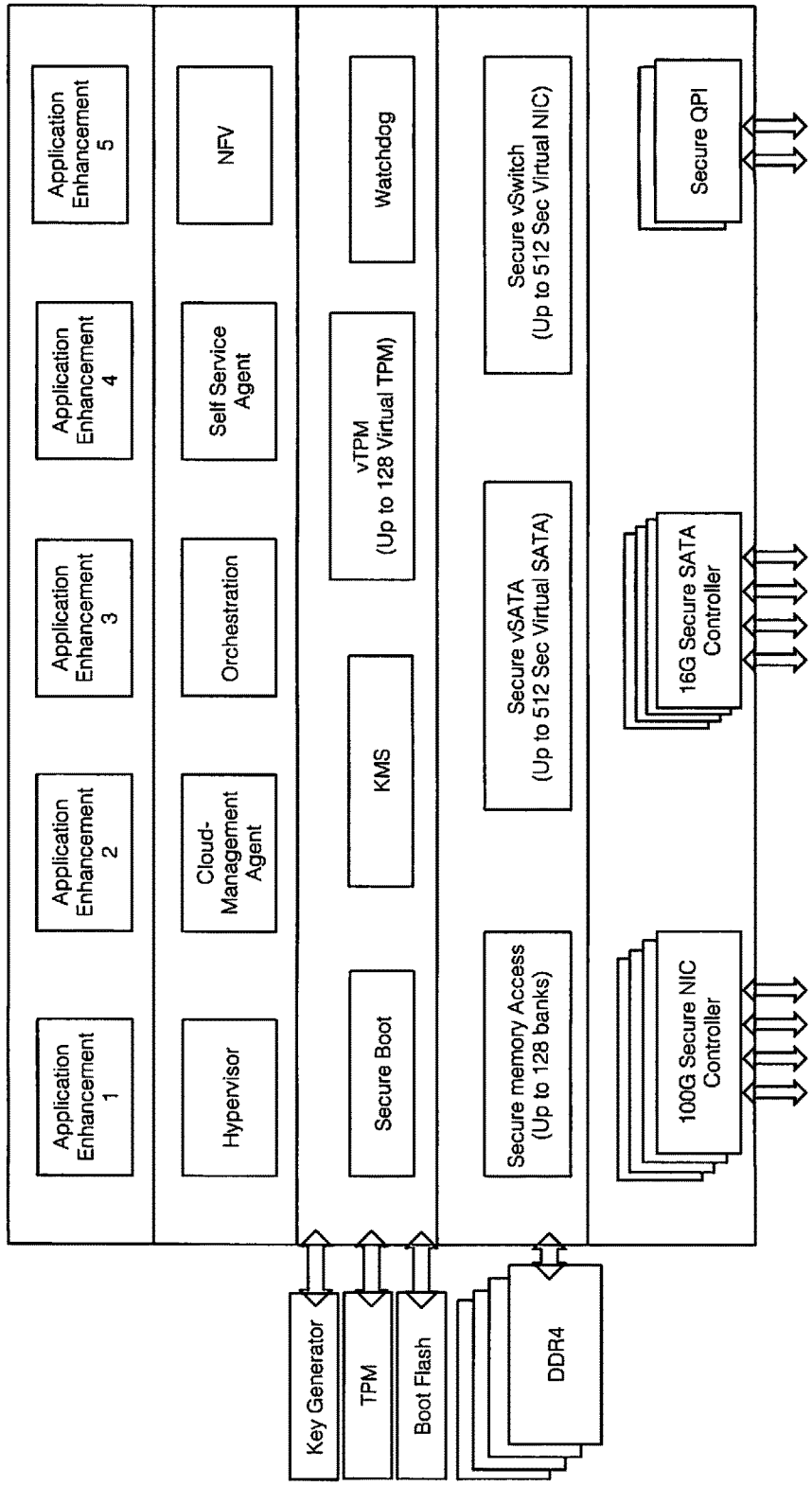
FIG. 16 illustrates a processor or coprocessor including a plurality of application enhancement logic loaded at run time.

FIG. 16 illustrates a processor or coprocessor will run a variety of applications. In an embodiment, we organize illustrative applications having functional relationships in the same layer. It does not indicate a priority or precedence among the applications. As shown, the applications can be downloaded when the processor or coprocessor is a FPGA at run-time.) Thus, application enhancements 1-5 can reconfigure the FPGA to enhance performance of whatever applications are in use as illustrated by applications 1-5, and to offset the computing demands of implementing encryption in the data paths of the servers.

FIG. 16 also illustrates an embodiment that implements the security functions as well as known cloud or data center computing applications. As shown the coprocessor and processor will execute a virtual machine hypervisor, a cloud management agent, an orchestration, a self service agent, and network function virtualization (NFV), a secure boot program, a key management storage (KMS), a virtual trusted platform module (e.g., up to 128 virtual TPM), and a watchdog timer. *Wikipedia Boot Image* (2015), which is incorporated by reference herein, describes boot programs. As is known, the vTPM is based on a trusted platform module (TPM), which is a chip on the physical server that provides for storage encryption using a RSA asymmetric key. *Wikipedia Trusted Platform Module* (2015), which is incorporated by reference herein, describes the details of a trusted platform module. If a user activates the TPM, it creates a storage root key used to generate and store other encryption keys. Wikipedia Root certificate (2015), which is incorporated by reference herein, describes the details of a root certificate. A key generator will send encryption keys to be stored in the KMS, which will be used for the encryption of data as discussed above. The TPM will be virtualized in the vTPM, and the boot flash will send a program that will allow secure boot. The processor and coprocessor will communicate with a secure memory access (e.g., up to 128 banks), a secure virtual storage protocol (e.g., up to 512 secure virtual SATA), and a secure virtual switch (e.g., up to 512 secure virtual network interface card (NIC)). Berger et al., *vTPM: Virtualizing the Trusted Platform Module, IBM Research Report* (2006) describes virtual trusted platform modules in detail, which is incorporated by reference herein.

in various embodiments, we provide a secured server suitable for a cloud or data center wherein each object of the cloud has a unique identity that cannot be compromised; and cloud function cryptography key(s), wherein each cloud function uses a unique key that is generated by a cloud key management system (KMS) or by a customer KMS or by a combination of cloud KMS and customer KMS. In additional features, the server is tamperproof, wherein each cloud function is signed and the signature is periodically verified for integrity, and the behavior of each cloud function is monitored by deep packet inspection for logical or behavioral changes. Further, we can additionally provide a virtual probe giving the customer the ability to monitor the behavior of the processes of the server. In an embodiment, the virtual probe is implemented in a field-programmable gate array and customer of the cloud and data center can determine the probe points of the virtual probe. The trace is stored and customer can access it for examination. In an embodiment, the virtual probe operates like a virtual logic analyzer (See Wikipedia "Logic Analyzer" article submitted in the information disclosure statement of the parent U.S. Pat. No. 9,667,606 B2 on the filing date of Jul. 1, 2015) to monitor promised behavior. In the FPGA we implement logic and a network analyzer/sniffer that permits us to use a white box security involving packet inspection for each and every customer or cloud function for logical or behavioral changes.

What is claimed:

1. A method of transferring a virtual machine descriptor and associated keys through a key management server from a first physical server to a second physical server, comprising:

sending a storage key management server (KMS) public key to a first physical server;
sending the storage KMS public key to a second physical server;
encrypting the first physical server key with the KMS public key and sending the encrypted first physical server key to the storage KMS;
encrypting the second physical server key with the KMS public key and sending the encrypted second physical server key to the storage KMS;
sending the first physical server key to a virtual machine (VM) to encrypt the VM descriptor;
encrypting the VM descriptor;
encrypting the VM storage key(s) with the first physical server key and sending it to the VM KMS;
sending the encrypted VM storage key(s) to the storage KMS;
decrypting the VM storage key(s) with the first physical server key and encrypting it with the second physical server key;
sending the VM storage key(s) encrypted with the second physical server key to the VM KMS;
sending the VM storage key(s) encrypted with the second physical server key to the second physical server;
sending the second physical server key to the VM at the second physical server to decrypt the VM storage key(s);
transferring the VM descriptor from the first physical server to the second physical server; and
decrypting VM storage key(s) using the second physical server key.

2. A non-transitory computer-readable medium for transferring a virtual machine from a first physical server to a second physical server comprising instructions stored thereon that when executed on server(s) perform the steps of:

sending a storage key management server (KMS) public key to a first physical server;
sending the storage KMS public key to a second physical server;
encrypting the first physical server key with the KMS public key and sending the encrypted first physical server key to the storage KMS;
encrypting the second physical server key with the KMS public key and sending the encrypted second physical server key to the storage KMS;
sending the first physical server key to a virtual machine (VM) to encrypt the VM descriptor;
encrypting the VM descriptor;
encrypting the VM storage key(s) with the first physical server key and sending it to the VM KMS;
sending the encrypted VM storage key(s) to the storage KMS;

decrypting the VM storage key(s) with the first physical server key and encrypting it with the second physical server key;

sending the VM storage key(s) encrypted with the second physical server key to the VM KMS;

sending the VM storage key(s) encrypted with the second physical server key to the second physical server;

sending the second physical server key to the VM at the second physical server to decrypt the VM storage key(s);

transferring the VM descriptor from the first physical server to the second physical server; and decrypting VM storage key(s) using the second physical server key.

* * * * *